United States Patent [19]

Goel

[11] Patent Number: 4,704,446

[45] Date of Patent: Nov. 3, 1987

[54] POLYURETHANES BASED ON URETHANE POLYOLS AND SHORT AND LONG CHAIN POLYOLS

[75] Inventor: Anil B. Goel, Worthington, Ohio

[73] Assignee: Ashland Oil, Inc., Ashland, Ky.

[21] Appl. No.: 835,693

[22] Filed: Mar. 3, 1986

[51] Int. Cl.[4] .............................................. C08G 18/66
[52] U.S. Cl. ...................................... 528/78; 528/28; 528/75
[58] Field of Search ............................ 528/28, 75, 78; 521/164

[56] References Cited

U.S. PATENT DOCUMENTS

| | | | |
|---|---|---|---|
| 3,655,588 | 4/1972 | Mosso et al. | 528/78 |
| 4,481,367 | 11/1984 | Knopf | 560/158 |
| 4,485,031 | 11/1984 | Olstowski et al. | 560/158 |
| 4,485,032 | 11/1984 | Olstowski et al. | 560/158 |
| 4,530,941 | 7/1985 | Turner et al. | 528/78 |
| 4,543,405 | 9/1985 | Ambrose et al. | 528/78 |
| 4,631,320 | 12/1986 | Parekh et al. | 525/452 |

*Primary Examiner*—Veronica P. Hoke
*Attorney, Agent, or Firm*—John F. Jones

[57] ABSTRACT

A process for preparing a novel polyurethane comprising blending a poly (alkylene ether) urethane polyol with both short- and long-chain polyols and reacting the blend with a polyisocyanate is described.

8 Claims, No Drawings

POLYURETHANES BASED ON URETHANE POLYOLS AND SHORT AND LONG CHAIN POLYOLS.

This invention relates to a process for preparing novel polyurethanes by blending poly (alkylene ether) urethane polyols with short- and long-chain polyols and reacting the resulting blends with polyisocyanates.

The preparation of polyurethanes, both cellular and non-cellular, by the reaction or organic polyisocyanates, polymeric polyols and extenders such as glycols, alkanolamines and diamines is well known in the art. The prior art also describes the synthesis of thermoplastic and thermoset polyurethane polymers having varying degrees of flexibility and other physical properties which have been achieved by using the appropriate amounts of short and long chain polyols. For instance, U.S. Pat. No. 4,376,834 describes the synthesis of high impact strength thermoplastic polyurethane resins from organic polyisocyanates with a mixture of a high molecular weight (500–20,000) polyol and one or more low molecular weight extenders. Although the polymers do show good physical properties, the polymerization requires high temperature and pressure processing which is probably due to the incompatible polyol compositions. U.S. Pat. Nos. 4,485,031 and 4,485,032 disclose the use of compatibilizers (urea and substituted ureas) for such short and long chain polyol blends.

The use of poly (alkylene ether) urethane polyols obtainable from the reaction of the corresponding poly (alkylene ether) amines with ethylene or propylene carbonate to blend with one or more short chain polyol extenders and long chain polyols in the preparation of cellular and non-cellular polyurethane polymers has not previously been disclosed.

Primary and secondary amines will react with ethylene or propylene carbonate to yield the corresponding hydroxy containing urethane monomers. Thus, when poly (alkylene ether) di- or polyamines of molecular weights ranging from 200 to 20,000 have been reacted with ethylene or propylene carbonate at temperatures of from about room temperature up to about 150 degrees C. the corresponding poly (alkylene ether) di- or polyurethane polyols are formed. The reactions of alkanol amines such as ethanolamine with these carbonates yields urethane diols or polyols at temperatures below about 100 degrees C. Above 100 degrees C there results some cyclization to give the corresponding oxazolidones and the glycols.

The urethane polyols based on poly (alkylene ether) polyamines and ethylene or propylene carbonate have been found to blend conveniently with the other known short and long chain polyols containing functional groups such as alkylene ether, esters, amides and the like which have been prepared based on ethylene oxide, propylene oxide, tetrahydrofuran, caprolactone, and the like. Poly (alkylene ether) polyurethane polyols may also be prepared in these blends in situ by prereacting them with small amounts (0.01 to 0.2 equivalent of NCO per OH group) of diisocyanates such as MDI. The blends can also contain small amounts of additives such as oxazolines, phenolics and similar materials.

I have found that the blends of long-chain poly (alkylene ether) polyurethane polyols wherein the alkylene group contains from 2 to 4 carbon atoms (molecular weight 400–20,000) with one or more short-chain polyols such as propylene glycol, dipropylene glycol, tripropylene glycol, butane diol, ethylene glycol, diethylene glycol and the like (molecular weight 60–350) and optionally other high molecular weight polyols, when reacted with polyisocyanates produces cellular and non-cellular polyurethane polymers having high structural strength properties such as impact strength, flexural strength, flexural modulus, heat distortion temperature, and the like. Additives which are capable of reacting with isocyanates, such as epoxides, bicyclic amide acetals, primary and secondary amines, oxazolines, thiols, and the like may also be added to obtain varying improved properties. The polyurethane polyols also provide better thermal stability, flexibility and color stability to polyurethanes prepared therefrom.

Poly (alkylene ether) diamines or polyamines which are useful in this invention include those which result from the amination reaction of the corresponding poly (alkylene ether) polyols having molecular weights ranging from 200 to 20,000. Primary and secondary amines react with ethylene or propylene carbonate to yield the corresponding hydroxy containing urethane monomers.

The urethane polyols based on poly (alkylene ether) polyamines have been found to blend conveniently with the other known short- and long-chain polyols containing functional groups such as alkylene-ether, esters, amides, etc. which have been prepared based on ethylene or propylene oxide, tetrahydrofuran, caprolactone, etc.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-4′-diisocyanate, benzene-1,2,4-triisocyanate, xylene-1,4-diisocyanate, xylylene-1,3-diisocyanate, 4,4′-diphenylene methane diisocyanate, 4,4′-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

Long chain polyols which are useful in this invention are polyether polyols, polyester polyols, hydroxy-terminated polycarbonates, hydroxy-terminated polybutadienes, hydroxy-terminated polyethers, hydroxy-terminated polybutadiene-acrylonitrile copolymers, hydroxy-terminated copolymers of dialkyl siloxane and alkylene oxides such as ethylene oxide, propylene oxide and the like, provided the molecular weights of these materials are in the molecular weight range of from about 400 to 20,000 and the functionality of these materials is no greater than about 6 and preferably, the functionality is in the range of from about 2 to 4.

Illustrative of polyether polyols are polyoxyethylene glycols, polyoxypropylene glycols which, optionally, have been capped with ethylene oxide residues, random and block copolymers of ethylene oxide and propylene oxide, propoxylated tri-and tetrahydric alcohols such as glycerine, trimethylolpropane, pentaerythritol, and the like, which propoxylated compounds have been capped with ethylene oxide, polytetramethylene glycol, random and block copolymers of tetrahydrofuran and ethylene oxide and or propylene oxide, and products derived from any of the above by reaction with di- or higher functional carboxylic acids or esters derived from said acids in which latter case ester interchange occurs and the esterifying radicals are replaced by polyether polyol radicals. The polyether polyols can also include the vinyl reinforced polyether polyols, e.g. those obtained by the polymerization of styrene and or acrylonitrile in the presence of the polyether.

Illustrative polyester polyols are those prepared by polymerizing epsilon-caprolactone using an initiator such as ethylene glycol, and those prepared by esterification of polycarboxylic acids such as phthalic, terephthalic, succinic, glutaric, adipic, azelaic and the like acids with polyhydric alcohols such as ethylene glycol, butanediol, glycerol, trimethylolpropane, 1,2,6-hexanetriol, cyclohexanedimethanol and the like. Also useful polyesters are those obtained by esterifying a dimeric or trimeric fatty acid, optionally mixed with a monomeric fatty acid, such as oleic acid, with a relatively long chain aliphatic diol such as hexane-1,2,6-diol and the like.

Illustrative polycarbonates containing hydroxyl groups are those prepared by reaction of diols such as propane-1,3-diol, butane-1,4-diol, hexane-1,6-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkyl siloxanes such as dimethylsiloxane and the like; see, for instance U.S. Pat. No. 4,057,595.

Illustrative of the hydroxy-terminated polybutadiene copolymers are the compounds available under the trade name Poly BD Liquid Resins from Arco Chemical Company.

Illustrative of the hydroxy terminated butadiene/acrylonitrile copolymers are materials available under the trade name Hycar hydroxyl-terminated (HT) Liquid Polymers from B. F. Goodrich Co.

The short chain polyols useful in this invention have molecular weights in the range of from about 60 to less than 400 and include aliphatic straight and branched chain diols, including cyclo-aliphatic diols, preferably having from about 2 to about 8 carbon atoms. Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,4-cyclohexanedimethanol, and the like and mixtures thereof. Also included are diethylene glycol, dipropylene glycol, tripropylene glycol. Trifunctional short chain polyols such as glycerol, trimethylolpropane and the like can also be employed alone or in admixture with one or more of the above diols in the preparation of thermoset polymers in this invention.

Although the preparation of polyurethanes by the process of this invention can be carried out in the absence of any urethane catalyst, advantageous use of urethane and isocyanurate known in the art, including tertiary amines, organotin carboxylates and alkoxides, metal salts such as alkali and alkaline earth metal carboxylates, zinc carboxylates, iron acetyl acetonate, etc. often results in rapid polymerization and improved polymer properties. The isocyanate equivalents per hydroxy (or combined hydroxy and other functionality reactive towards isocyanate group) can be in the range of 0.8 to 3.0. For synthesis of an elastomeric product, the isocyanate to hydroxy ratio should be in the range of 0.8:1 to 1.05:1 and for thermoset polymers the isocyanate ratio should be greater than 1. This invention is further illustrated in the following representative examples.

EXAMPLE 1

A poly (alkylene ether) urethane polyol was prepared by reacting 500 g of poly (propylene ether) triamine (molecular weight about 5,000, Jeffamine 5000 from Texaco Co.) with 31 g of propylene carbonate at 105 degrees C. for five hours. The infrared spectrum of the resulting liquid showed the presence of a band at 1680–90 cm$^{-1}$ indicative of the urethane group. A part of this polyol (15 g) was mixed with 15 g of propylene glycol, 8 g of dipropylene glycol and 0.36 g of tertiary amine catalyst (N, N', N"-tris(dimethylamine propyl) hexahydrotriazine. The resulting blend was degassed on a rotary evaporator under reduced pressure and mixture rapidly with 95 g of degassed modified liquid methylene bis(phenyl isocyanate) (NCO equivalent weight 144) for about 10 to 15 seconds during which a clear solution formed. This solution was poured immediately into a hot mold kept at 80 degrees C. and was prepared by parallel spacing two mold release coated glass plates apart with ⅛ inch spacers. Polymerization occurred within a few seconds to give an opaque white solid polymer sheet which was postcured at 140 degrees C. for 30 minutes and was tested for physical properties. The polymer was found to have a notched izod impact strength (ASTM D-256) of 1.2 foot pounds/inch of notch, a flexural strength (ASTM D-790) of 15,902 psi, a flexural modulus of 344,066 psi and a heat distortion temperature of 109 degrees C.

EXAMPLE 2

The procedure of Example 1 was repeated using 16 g of the poly (alkylene ether) polyurethane polyol, 14 g of propylene glycol, 8 g of dipropylene glycol, 6 g of liquid diglycidyl ether of Bisphenol-A, 0.4 g of the tertiary amine catalyst and 100 g of the diisocyanate. The opaque white polymer obtained after postcuring for 30 minutes at 130 degrees C. was found to have a notched izod impact strength of 1.3 foot pounds/inch of notch and a heat distortion temperature of 114 degrees C.

EXAMPLE 3

The procedure of Example 1 was followed using 17 g of the poly (alkylene ether) urethane polyol, 15 g of propylene glycol, 8 g of dipropylene glycol, 5 g of oxazolidone, 0.4 g of the tertiary amine catalyst and 100 g of the liquid polyisocyanate. The resulting polymer sheet was found to have a notched izod impact strength of 1.2 foot pounds/inch of notch and a heat distortion temperature of 107 degrees C.

EXAMPLE 4

A liquid poly (alkylene ether) urethane diol was prepared by reacting 200 g of 2000 molecular weight poly (propylene ether) diamine (Jeffamine D 2000 from Texaco Co.) with 20 g of propylene carbonate at 105 degrees C. for five hours. A part of this liquid (16 g) was blended with 16 g of propylene glycol, 8.3 g of dipropylene glycol, 0.37 g of tertiary amine catalyst and the degassed solution was rapidly mixed with 100 g of degassed liquid methylene bis (phenyl isocyanate) and poured into the hot mold (90 degrees C.) described in Example 1. Rapid polymerization occurred within 10 seconds to give a white opaque polymer which was postcured at 100 degrees C. for 30 minutes. The resulting polymer sheet was found to have a notched izod impact strength of 1.4 foot pounds/inch, a flexural strength of 14,922 psi, a flexural modulus of 324,193 psi and a heat distortion temperature of 103 degrees C.

EXAMPLE 5

The procedure of Example 1 was followed using the blend of 10 g of poly (alkylene ether) urethane polyol of Example 4, 5 g of the poly (alkylene ether) urethane polyol of Example 1, 16 g of propylene glycol, 8.3 g of dipropylene glycol, 0.38 g of the tertiary amine catalyst of Example 1 and reacting with 100 g of the liquid methylene bis (phenyl isocyanate) of Example 1. The resulting white opaque polymer sheet obtained showed a notched izod impact strength of 1.05 foot pounds/inch of notch, a flexural strength of 15,550 psi, a flexural modulus of 321,792 psi and a heat distortion temperature of 104 degrees C.

EXAMPLE 6

The procedure of Example 1 was followed using 17 g of the poly (alkylene ther) urethane polyol of Example 4, 15 g of propylene glycol, 9 g of the urethane diol obtained from the reaction of ethanolamine with propylene carbonate at a temperature below 80 degrees C., 0.4 g of the tertiary amine catalyst and 98 g of the liquid polyisocyanate of Example 1. The opaque white polymer which resulted showed a notched izod impact strength of 1.1 foot pounds/inch of notch and a heat distortion temperature of 102 degrees C.

EXAMPLE 7

The procedure of Example 1 was followed using 100 g of poly (propylene ether) diamine (molecular weight of about 400, Jeffamine D-400 from Texaco Co.) and propylene carbonate (51 g) to give the corresponding urethane diol in about four hours at 100 degrees C. A part of the product (15 g) was homogeneously blended with propylene glycol (12 g), dipropylene glycol (8 g) and the tertiary amine catalyst (0.35 g) and reacted with 100 g of the liquid isocyanate. The resulting opaque white polymer sheet was found to have a notched izod impact strength of 0.6 foot pounds/inch of notch, a flexural strength of 19,257 psi, a flexural modulus of 419,144 psi and a heat distortion temperature of 95 degrees C.

I claim:

1. A process for preparing a novel polyurethane comprising blending a poly (alkylene ether) urethane polyol having a molecular weight in the range of from 400 to 20,000 in which the alkylene group contains from 2 to 4 carbon atoms with both short-chain and long-chain polyols said short-chain polyols being selected from the group consisting of aliphatic and cycloaliphatic diols having from 2 to 8 carbon atoms and having molecular weights of from 60 to less than 400 and said long-chain polyols having molecular weights in the range of from 400 to 20,000 and a hydroxyl functionality no greater than 6 and being selected from the group consisting of polyether polyols, polyester polyols, hydroxy-terminated polycarbonates, hydroxy-terminated polybutadienes, hydroxy terminated polybutadiene-acrylonitrile copolymers, hydroxy terminated copolymers of dialkyl silane and ethylene oxide and hydroxy-terminated copolymers of dialkyl silane and propylene oxide and reacting the resulting blend with a polyisocyanate.

2. The process of Claim 1 wherein the poly (alkylene ether) urethane polyol is one obtained by reaction of a poly (alkylene ether) amine with ethylene or propylene carbonate.

3. The process of Claim 2 wherein the poly (alkylene ether) amine is a poly (alkylene ether) di- or polyamine of molecular weight ranging from 200 to 20,000.

4. The process of Claim 3 wherein the short-chain polyols of general formula HO—$(R)_n$$(OH)_m$ where R is an hydrocarbon having from 2 to 4 carbon atoms, n is an integer from 1 to 10 and m is 1 to 3 and having a molecular weight in the range of from 60–350.

5. The process of claim 4 wherein the long-chain poly (alkylene ether) urethane polyol is one in which the molecular weight is in the range of from 400–20,000 and the alkylene group contains from 2 to 4 carbon atoms.

6. The process of claim 4 wherein the poly (alkylene ether) urethane polyol is formed in situ by reacting the blends of short and long chain polyols with from 0.01 to 0.1 equivalents of NCO per OH group of a diisocyanate.

7. The process of claim 4 wherein the poly (alkylene ether) urethane polyol is present in about 30% by weight based on the weight of all the polyols.

8. The process of claim 7 wherein the polyisocyanate is methylene bis (phenyl isocyanate).

* * * * *